United States Patent [19]

Cao et al.

[11] Patent Number: 4,677,560
[45] Date of Patent: Jun. 30, 1987

[54] SPEED CONTROL FOR MOTOR VEHICLES WITH MICROCOMPUTER STEP-BY-STEP CONTROL

[75] Inventors: Chi-Thuan Cao, Korntal-Münchingen; Helmut Janetzke, Schwieberdingen; Henning Cordes, Eberdingen; Helmut Kauff, Schwieberdingen, all of Fed. Rep. of Germany

[73] Assignee: Robert Bosch GmbH, Stuttgart, Fed. Rep. of Germany

[21] Appl. No.: 679,311

[22] Filed: Dec. 7, 1984

[30] Foreign Application Priority Data

Dec. 8, 1983 [DE] Fed. Rep. of Germany ....... 3344415

[51] Int. Cl.$^4$ ...................... G05D 13/62; B60K 31/00
[52] U.S. Cl. ............................... 364/431.07; 123/357; 364/426
[58] Field of Search ........................... 364/431.07, 426; 123/350, 352, 357, 361

[56] References Cited

U.S. PATENT DOCUMENTS

| | | | |
|---|---|---|---|
| 3,886,915 | 6/1975 | Taplin | 123/357 |
| 4,094,378 | 6/1978 | Scheyhing et al. | 123/352 X |
| 4,113,046 | 9/1978 | Arpino | 123/352 X |
| 4,140,202 | 2/1979 | Noddings et al. | 123/352 X |
| 4,196,466 | 4/1980 | Noddings et al. | 123/352 X |
| 4,301,883 | 11/1981 | Collonia | 123/352 X |
| 4,352,403 | 10/1982 | Burney | 123/352 X |
| 4,499,412 | 2/1985 | Locher et al. | 123/357 X |
| 4,537,272 | 8/1985 | Tanigawa et al. | 123/352 X |

Primary Examiner—Felix D. Gruber
Attorney, Agent, or Firm—Frishauf, Holtz, Goodman & Woodward

[57] ABSTRACT

The speed to be measured, either engine speed or vehicle (drive wheel) speed, is measured by a tachogenerator which trips a timer to provide a series of measurements. When the system is in use, a driver can store the actual speed at a selected moment as the desired speed. From a linearized model of vehicle speed or engine speed response to acceleration or deceleration of the engine by displacement of a control member, system parameters $a_1$ and $b_1$ are derived. The actual speed signal is multiplied by $a_1$ and added algebraically (to produce a difference signal) to the desired speed signal, with the resulting signal then being multiplied by another constant derived from the system parameter $b_1$ by reference to weighting factors p and q of a cost minimizing equation relating to the relative significance of obtaining a small control deviation and of limiting or increasing the amplitude of the control signal. An output signal is then provided by the second multiplying stage. The system can be constituted in an analog fashion or it may operate digitally by means of a microprocessor. Smoothing of the input and output signals may be provided by low-pass filtering in the analog case and by providing a moving average with the preceding value in the digital case. This type of regulation, which may be referred to as cyclic or as single-step control, assures an aperiodic run-in characteristic and is stable in all speed ranges.

2 Claims, 2 Drawing Figures

SPEED CONTROL FOR MOTOR VEHICLES WITH MICROCOMPUTER STEP-BY-STEP CONTROL

This invention concerns a method of controlling speed in a motor vehicle, which may be engine speed or vehicle travel speed, in which the actual speed value is represented by the electrical signal of a tacho-generator and the desired speed value is represented, for example, by the position of the accelerator pedal of the vehicle, and a predetermined mathematical function is utilized, by means of a microcomputer to derive a quantity for comparison with the desired speed value as the result of which a setting magnitude is prescribed for a positioning device that controls the vehicle engine to modify the actual speed value.

Systems and methods for control or regulation of vehicle speed or of engine speed have long been known in the motor vehicle industry. One of the simplest possibilities is to fix the accelerator pedal in a particular position, for example by means of a hand pull. With such primitive solution of the problem, it is not possible to regulate out even simple changes of vehicle loading, for example the beginning of a climb or the onset of a headwind. Later, control by means of electromagnets has been tried, but these speed controls likewise did not go into any great degree of use. In more recent times, vehicle speed or engine speed controls have been tested utilizing a control system incorporating a microcomputer. Such control takes place by the actuation of a positioning device, which in the case of vehicles with an internal combustion engine, changes the operating parameters of the engine. In the case of the usual Otto engines, the air supply is varied, for example by means of an "electronic accelerator pedal". In the case of Diesel engines, variations of fuel injection, usually by the control rod displacement of the diesel injection, is common.

Up to now, PI control algorithms have been used for vehicle speed control systems. The practical use of such algorithms requires a relatively high expense. Furthermore, PI controllers have a tendency in such cases to go into badly damped oscillations. This disturbs riding comfort, a quality which is assumed to be necessary for vehicles of the highest class. The control characteristics, moreover, often leave much to be desired in cases of change of desired speed and in cases of operation condition changes, for example in driving in hilly regions.

It is an object of the present invention to provide a speed control for motor vehicles or their engines that can operate on the basis of a simple control algorithm and requires relatively little expense, even for application.

Briefly, a linearized model of the vehicle is provided and for description of the actual speed value y(t) in a manner related to the setting magnitude (u(t)), the formula $T \cdot dy(t)/dt + y(t) = K \cdot u(t)$ is used, in which T is a time constant and K is an amplification constant. As physical vehicle magnitudes, at least one of the following is selected: torque characteristic of the engine, transmission gear ratio, gear ratio between engine and drive wheel, efficiency of power transfer, drive wheel diameter, air resistance of the vehicle.

It is particularly advantageous to use a cyclical controller instead of the previously conventional PI controller. The small control difference that is obtainable is a further advantage.

In contrast to the usual PI controllers, an aperiodic falling into step of the speed is obtained under all driving conditions.

It is highly advantageous that it is possible for the controller to have a systematic construction on the basis of a mathematical model, the parameters of which can be derived from the physical vehicle magnitudes. On account of the favorable properties of the closed control loop, a desired control calculation is possible by previously establishing the location of the poles of the loop characteristic. A compromise between the control difference (accuracy) and the control expense can be directly determined by the evaluation of a cost function that can be set forth in advance and likewise a compromise between control accuracy and obtainable riding comfort.

By the method, the invention and the system for carrying it out, it is possible to obtain good control characteristics, both by deliberate change of the desired speed value, for example by recalling for use an earlier desired value and also in the case of disturbances or in the case of changes resulting from external influences, for example in the transition from a level road to an upward grade.

BRIEF DESCRIPTION OF THE DRAWINGS

The invention is further described by way of illustrative example by reference to the annexed drawings, in which.

DESCRIPTION OF THE ILLUSTRATED EMBODIMENTS

Figure 1:
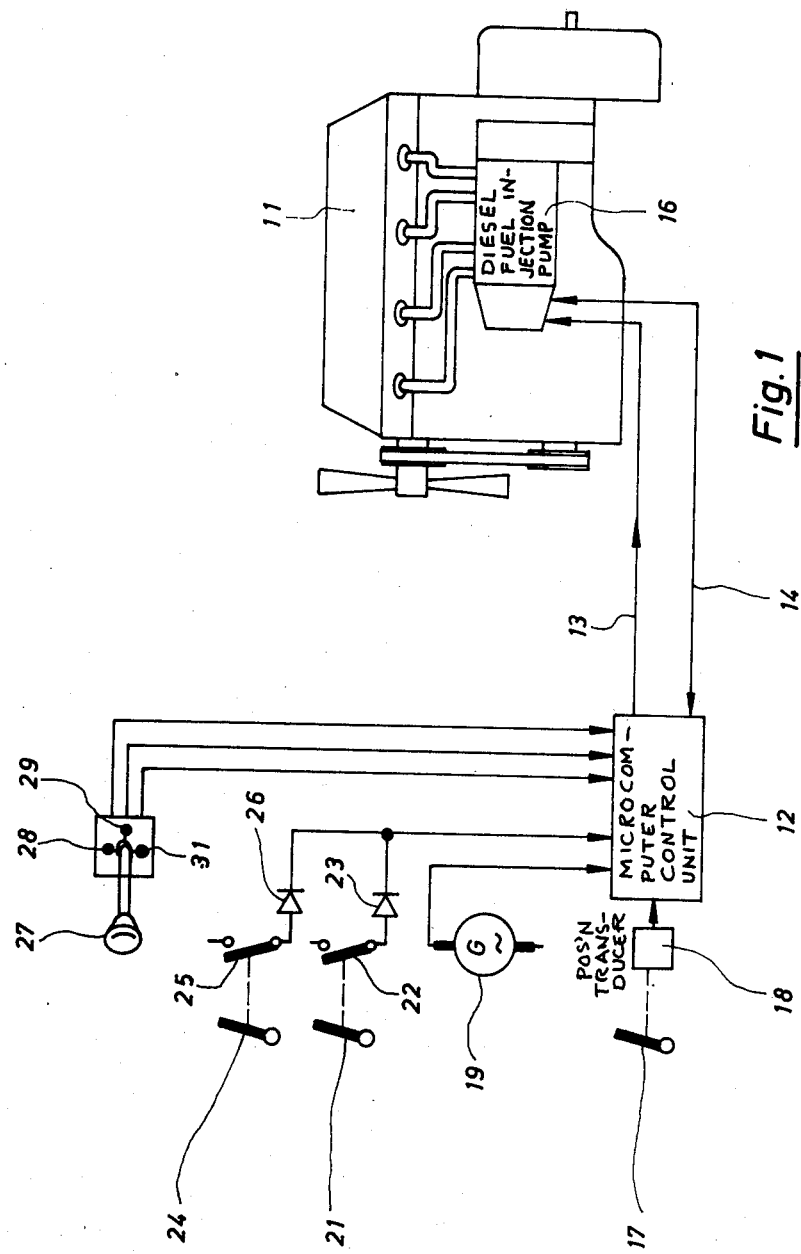
FIG. 1 shows the equivalent circuit of a control system for vehicle speed control.

FIG. 1 is an overall diagram of the control system of a vehicle speed control. An internal combustion engine 11, in the illustrated case a Diesel engine, has a microcomputer control apparatus 12 connected to control the Diesel fuel injection pump 16 by means of an electromagnetic positioning device. A connecting line 13 serves to transmit a positioning signal to a positioning device setting the fuel injection value and another connecting line 14 serves for reporting back to the microprocessor the actual position at which the positioning device is set. The system also includes an accelerator pedal 17 with an associated accelerator pedal position transducer 18. The output of the accelerator pedal position transducer 18 is connected with an input of the control apparatus 12. A tachogenerator 19 serves for determining the momentary speed of the vehicle in which the engine 11 is situated. The output of the tacho-generator 19 is also connected with an input of the control apparatus 12. A clutch pedal 21 is connected to a clutch pedal switch 22, which in turn applies a signal through a decoupling diode 23 to still another input of the control apparatus 12. A brake pedal 24 is coupled mechanically with a brake pedal switch 25, which also is connected, through a decoupling diode 26, with an input of the control apparatus 12. Finally, there is also a function switch 27 on the steering column of the vehicle. The function switch 27 can be put into any one of three positions 28, 29 and 30. In the position 28, a "resume" command signal is provided, in the position 29, a "store" command signal and in the position 31 a "switch-out" command signal. The meaning of the individual signals is further explained below. From each of the three switch positions, a signal line is connected to a corresponding input of the control apparatus 12.

The operation of the speed control system is described in detail in what follows. In operation of a motor vehicle equipped with the engine 11 and the control system shown in FIG. 1, the driver first brings the vehicle to a speed desired by him by operation of the accelerator pedal 17. Then he sets the function switch 27 to position 29, "store". The actual vehicle speed y(k), which has been reached at this moment k, is stored in the control apparatus 12 as the desired speed value w(k+1) in the next instant designated as the instant k+1. The interval from the instant k to the instant k+1 is exactly the scanning or sampling interval $T_A$. Within the sampling interval $T_A$, one control calculation is made.

If the driver puts the function switch 27 in the position 31, "switch-out", the speed control is switched out.

The speed control is also switched out by activation of the brake pedal 24. A "switch-out" signal is transmitted to the control apparatus 12 by the brake pedal switch 25 and the decoupling diode 26. The speed control system is also switched out by actuation of the clutch pedal 21. In the latter case, a "switch-out" signal is provided by the clutch switch 22 through the decoupling diode 23.

If the driver desires to resume the speed at which he was previously driving, he can realize this switch also with the function switch 27. He must then put the function switch 27 in the position 28, "resume". The vehicle speed which the driver had previously put in will then be taken over as the desired speed by the control apparatus 12.

Figure 2:
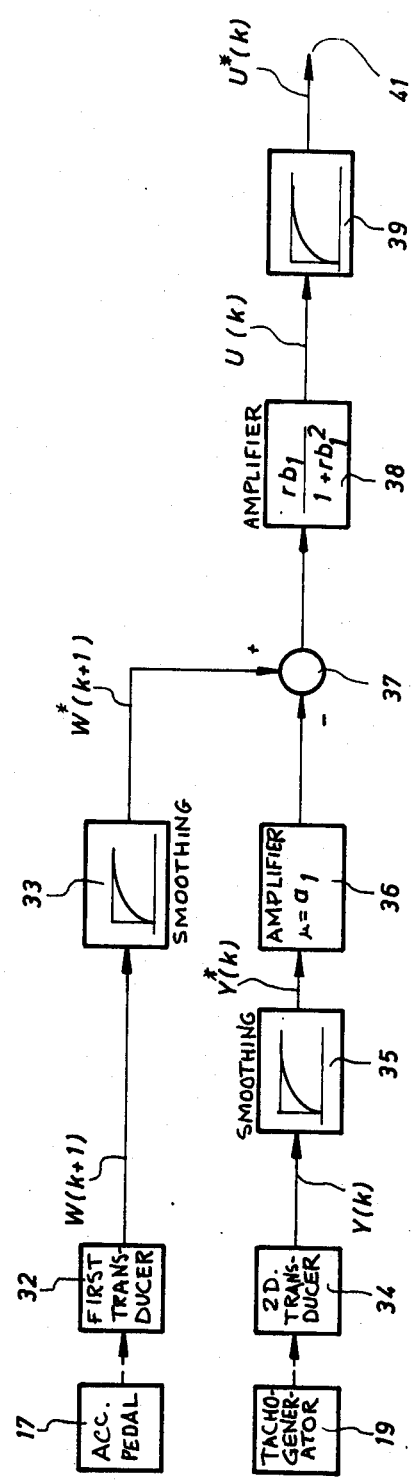
FIG. 2 represents a structure of a control system according to the invention.

Further description of the speed control of the invention follows with reference to FIG. 2.

In the block diagram given in FIG. 2 is a first transducer 32 for the desired speed w(k+1). A first smoothing stage 33, which is optional, is shown modifying the output of the first transducer 32. The second transducer 34 for the actual speed y(k) is provided which preferably has a second smoothing stage 35 connected at its output. The input of a first amplifier 36 is connected to the output of the second smoothing stage 35. The output of the amplifier 36 is supplied to one input of a summing circuit 37, of which another input is connected to the output of the first smoothing stage 33. The output of the summing stage 37 is connected to the input of a second amplifier 38, the output of which preferably goes through a third smoothing stage 39. The output 41 of this third smoothing stage is then the output of the controller of the system.

In the speed controller, the actual vehicle speed y(k) and the desired vehicle speed w(k+1) are necessary. The former is delivered as a pulse signal from the tachogenerator 19 and is then processed by the second transducer 34 in the control apparatus 12. The transducer 34 functions as, among other things, a timer, which counts the duration of the period of the pulses delivered by the tachogenerator 19. The output voltage of the second transducer 34, namely y(k), is smoothed in a low-pass filter constituted by the second smoothing stage 35. The output voltage is then as follows:

$$y^*(k) = f_y \cdot y^*(k-1) + (1-f_y) \cdot y(k)$$

The desired speed w(k+1) is presribed by the driver. By means of the function switch 27 on the steering column of the vehicle, he can select the above-described positions 28, 29 and 31 of that switch. Since the desired speed value is always determined one step or cycle in advance, it has the index k+1 (from k to k+1). The desired speed value is read into the first transducer 32.

The desired speed value w(k+1) can, to the extent needed, by smoothed by a low-pass filter, namely the first smoothing stage 33. The thereby delayed desired value is then $$w^*(k+1) = f_w \cdot w^*(k) + (1-f_w) \cdot w(k+1)$$

The design of the controller according to the invention is based on a linearized model of the vehicle in question. In a known way, constants can be determined from physical magnitudes relating to the vehicle by which a vehicle model can be established. Physical vehicle magnitudes are, for example, the torque characteristic of the motor, the transmission gear ratio, the gear ratio between motor and drive wheels, the efficiency of force transmission, the wheel radius, the air resistance to the motion of the vehicle and others as well. For a vehicle, there can then be obtained an amplification constant K and a time constant T. The vehicle model is then described by the following differential equation $$T \cdot dy(t)/dt + y(t) = K \cdot u(t)$$

u(t) is the setting magnitude and y(t) is the vehicle speed. In the design of the controller, a difference equation is used which is equivalent to the above model equation. For this purpose, the vehicle constants K and T are converted into system parameters $a_1$ and $b_1$. Furthermore, the sampling rate $T_A$, already described above, is introduced. The conversion formulas are:

$$a_1 = \exp(-T_A/T)$$

$$b_1 = K \cdot (1-a_1)$$

The equivalent difference equation is as follows $$y(k+1) = a_1 \cdot y(k) + b_1 \cdot u(k)$$

$y_{(k)}$ and $u_{(k)}$ define the speed and the setting magnitude at a particular (sampling) instant k. A controller can be systematically designed on the basis of the system parameters $a_1$ and $b_1$. As the criterion for the controller design there is selected according to the invention a quadratic cost function I. The regulation difference w(k+1)−y(k+1) and the positioning amplitude u(k) are weighted with corresponding weighting factors p and q. The cost function is then $$I = p \cdot (w(k+1) - y(k+1))^2 + q \cdot (u(k))^2.$$

This cost function is to be minimized. The cost function here selected has the following advantages in comparison to a conventional optimization criterion over several intervals of time $$\left( I_2 = \sum_{i=1}^{K} [P \cdot (w(i) - y(i))^2 + q \cdot u(i)^2] \right):$$

Simple mathematical means are already available for obtaining the solution. The expense of design is thereby greatly reduced. Commonly it is necessary in an optimization process to solve Riccatti difference equations over several increments of time.

It is still more important that the information regarding the future desired speed w(k+1) is utilized in the controller. In this manner the controller receives the desired value always one step ahead and therefore can also take hold at an early time.

The positioning amplitude, thus the output magnitude of the controller to be designed, which minimizes the cost function I, is found by the derivative of the magnitude I with respect to u(k). There are introduced for that purpose the following abbreviations:

$$V = r \cdot b_1 / (1 + r \cdot b_1^2).$$

$$r = p/q$$

and there is obtained then for the control magnitude u(k) the following formula:

$$u(k) = V \cdot (w(k+1) - a_1 \cdot y(k))$$

Referring now to FIG. 2, the subtracted term within the outer parentheses is generated by the amplifier 36, in terms of y* since the smooth value of y is here involved. $a_1$ is a constant, since the sampling rate $T_A$ is constant, so that the amplifier 36 simply multiplies its input by a constant amplification factor $a_1$. The subtraction for providing the value of the expression within the outer parentheses in the last-given equation is performed by the summing circuit 37, in terms of w*, as well as y*, since in FIG. 2 both w and y have been filtered.

The multiplication by V is performed in the amplifier 38, the V again being a constant, being formulated by constants $b_1$, p and q, the last two being weighting factors assigned for minimizing the cost function and depending on the significance assigned from a cost point of view respectively to the control deviation (the inverse of the accuracy of control) and the positioning amplitude (which also is a cost parameter). For the analog system shown in FIG. 2, the constants are previously calculated with whatever mechanical aids may be most convenient, the latter not being built into the system, but the calculation may be stored in a computer program, so that the controller may be reset to utilize revised constants whenever cost factors or other matters should make it appear desirable.

The control magnitude u(k) can also, as may be required, be smoothed by a low-pass filter, the third smoothing stage 39, in order to prevent regulation unrest.

In this fashion, the obtaining of the control algorithm is rather simple. The structure of this controller is shown in FIG. 2 and has already been described. For developing the control algorithm, a pair of values $a_1$ and $b_1$ are selected, which correspond to the vehicle model in the mid-portion of the speed range. At the end of this description, one possible form of controller calculation in the form of a flow diagram is given.

The controller thus developed can be regarded as optimal with respect to the obtained control accuracy and the necessary positioning magnitude. By the introduction of the weighting factors p and q, the possibility is obtained to determine a compromise between control accuracy and positioning amplitude. Since the optimization is obtained from the instant k to the instant k+1, this controller can be called a single-step controller, although it may also be designated as a cyclic controller, as designated above, or as a recursive controller.

The position of the poles of the closed control loop, as mathematically graphed in the known analytical way, provide information regarding the selection of the factors p and q. A correctly targeted controller calculation is directly possible for various kinds of start-up or going-into-step processes. The described controller is robust because the only pole of the closed system which determines the dynamic property of the control loop always rmains within a stable pole region for all operating points of the speed range.

The control algorithm is very simply established. The speed controller thereby produced can be installed universally for all vehicle types and for all operating conditions. The controller makes possible a quick regulating out of disturbances and at the same time an excellent guiding behavior. The residual control deviation is very small.

The use of the analog circuit shown in FIG. 2 as an easily explained embodiment of the controller has already been described following the setting out of the formula for the control magnitude u(k).

In practice it is convenient to utilize a microcomputer to perform digitally the steps illustrated in analog fashion in FIG. 2 because of the great stability obtainable with digital computations over a long service life, compared to the stability of computations that depend upon amplification factors of amplifiers for multiplications.

There follows accordingly a flow diagram from which it will be evident how a microcomputer may be programmed to perform the control functions illustrated in FIG. 1, delivering a positioning signal u*(k) over the line 13 of FIG. 1 and utilizing a report-back line 14 to verify that the commanded positioning has taken place in response to the positioning signal. The flow diagram is as follows:

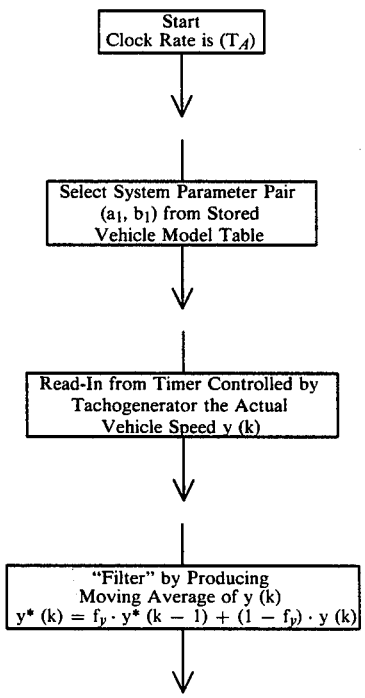

-continued

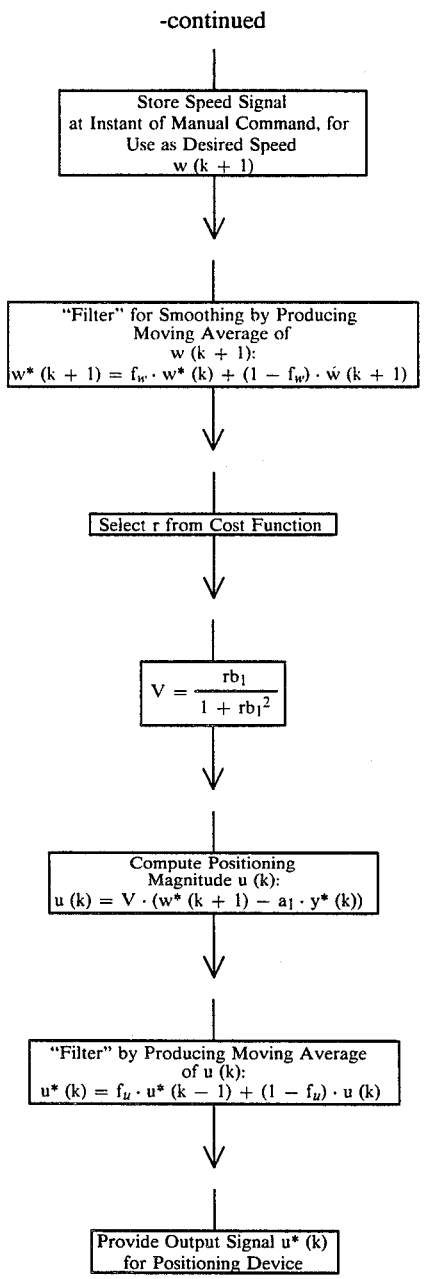

The provision of the output signal may be a directional signal which will stop when the report-back line 14 of FIG. 1 shows that a positioning magnitude u*(k) is reached, for example. That operation terminates a cycle and a new cycle starts in step with $T_A$ by reading in a new measurement of actual vehicle speed y(k) from the timer. The desired speed remains as stored until the driver manually cancels it and the steps requiring the desired speed value then are not performed again until the driver again stores a speed as the desired speed, or recalls the previously set value.

Although the invention has been described with reference to particular illustrative example, it will be understood that variations and modifications are possible within the inventive concept.

What is claimed is:

1. Apparatus for controlling a speed value in a motor vehicle by means of a displaceable control member of the vehicle engine constituted by varying engine speed in response to positioning signals supplied thereto, including first signal generating means (34) for producing periodic samples at a sampling interval (TA), an electrical signal indicative of the current value (y(k)) of the speed which is to be controlled and second signal generating means (32) for setting the value of an electrical signal representative of a desired value (w(k+1)) of said speed which is to be controlled, said apparatus further comprising:

first signal multiplying means for multiplying signals produced by said first signal generating means by a first constant factor corresponding to a first system parameter ($a_1$) to produce a weighted actual speed signal y*(k)a;

signal summing means for algebraically subtracting said actual speed signal from contemporaneous desired sped signals w*(k+1) produced by said second signal generating means to produce difference signals;

second signal multiplying means for multiplying said difference signals by a secod constant factor corresponding to a quantity (V) derived from second system parameter ($b_1$) by reference to constant weighting factors (p,q) of a cost function according to the relation $$V = r \cdot \frac{b_1}{1 + rb^2}$$

wherein r=p/q, said constant system parameters $a_1$ and $b_1$ being related to an amplification constant (K) and a time constant (T) by the equation $a_1 = e^{-T_A/T}$ and $b_1 = K(1-a_1)$ wherein $T_A$ is the sampling interval, said amplification factor (K) and said time constant (T) being defined in terms of a linear mathematical model of vehicle response to magnitude of displacement (u(t)) of said displaceable control member in accordance with the relation $T = dy(t)/dt + y(t) = K(u(t))$, and means for applying an output signal of said second multiplying means, corresponding to each of a succession of signal samples of said first signal generating means, in succession to said control member as successive positioning signals therefor.

2. Apparatus according to claim 1, wherein said second signal generating means (32) includes first moving average forming means (33) for producing said electrical speed-indicative signal (y*(k)) from speed current value signals (y(k)), said first signal generating means (34) includes second moving average forming means (35) for producing said electrical desired speed value signal (w*(k+1)) from desired speed signal (w(k)) provided by signal setting means of said second signal generating means, and third moving average forming means (39) for reducing high-frequency components in the succession of output values of said second signal multiplying means (38) respectively corresponding to a succession of signal samples of said first signal generating means said third moving average forming means being interposed between the output of said second signal multiplying means (38) and said means for applying an output signal to said control member.

* * * * *